United States Patent [19]

Basu et al.

[11] Patent Number: 4,914,663

[45] Date of Patent: Apr. 3, 1990

[54] GENERATION OF SHORT HIGH PEAK POWER PULSES FROM AN INJECTION MODE-LOCKED Q-SWITCHED LASER OSCILLATOR

[75] Inventors: Santanu Basu, Greenwich, Conn.; Robert L. Byer, Stanford, Calif.

[73] Assignee: The Board of Trustees of Leland Stanford, Jr. University, Stanford, Calif.

[21] Appl. No.: 185,086

[22] Filed: Apr. 22, 1988

[51] Int. Cl.⁴ ............................................. H01S 3/098
[52] U.S. Cl. .......................................... 372/18; 10/97
[58] Field of Search ........................ 372/18, 10, 92, 97

[56] References Cited

U.S. PATENT DOCUMENTS

| | | | |
|---|---|---|---|
| 4,375,684 | 3/1983 | Everett | 372/18 |
| 4,737,958 | 4/1988 | Sizer, II | 372/18 |
| 4,791,633 | 12/1988 | Esherick et al. | 372/18 |

OTHER PUBLICATIONS

Bernard et al., "Injection Tuning and Mode Locking of a TEA-CO₂ Laser on Low Gain Rotational Lines," Optics Communications, vol. 34, No. 1, pp. 101-102.
Taylor et al., "Mode-Locking Characteristics of a Neodymium-Glass Laser Using the Polymethine Dye No. 3955 in a Solid Host," Appl. Phys. Lett., vol. 31, No. 11, Dec. 77, pp. 732-735.
Carlus et al., "Reliable Passive Mode Locking with Slow Q-Switching", Appl. Phys. Letts, vol. 37, No. 8, Oct. 15, 1980, pp. 684-685.

Primary Examiner—William L. Sikes
Assistant Examiner—Georgia Y. Epps
Attorney, Agent, or Firm—Flehr, Hohbach, Test, Albritton & Herbert

[57] ABSTRACT

In a laser generator for generating short high peak power pulses of lasant radiation, a mode-locked laser oscillator generator generates a train of short pulses to be amplified. The pulses to be amplified, as of 10 ps pulse width, are temporally spaced by the optical resonator round-trip time, i.e., six ns for a three meter long optical resonator. The pulses to be amplified are then injected into a moving slab Q-switched laser oscillator for seeding thereof and amplification therein. The temporal spacing of the injected pulses is matched to the round-trip time of the optical resonator of the moving slab laser oscillator for mode-locking the moving slab oscillator to efficiently achieve 100 dB of gain in the amplified pulses. The resultant amplified pulses have a peak power as of 500 MW. By chirping and broadening of the pulses to 300 ps before amplification, followed by pulse width compression in a grating pair, pecosecond pulses are generated of 150 GW peak power.

11 Claims, 1 Drawing Sheet

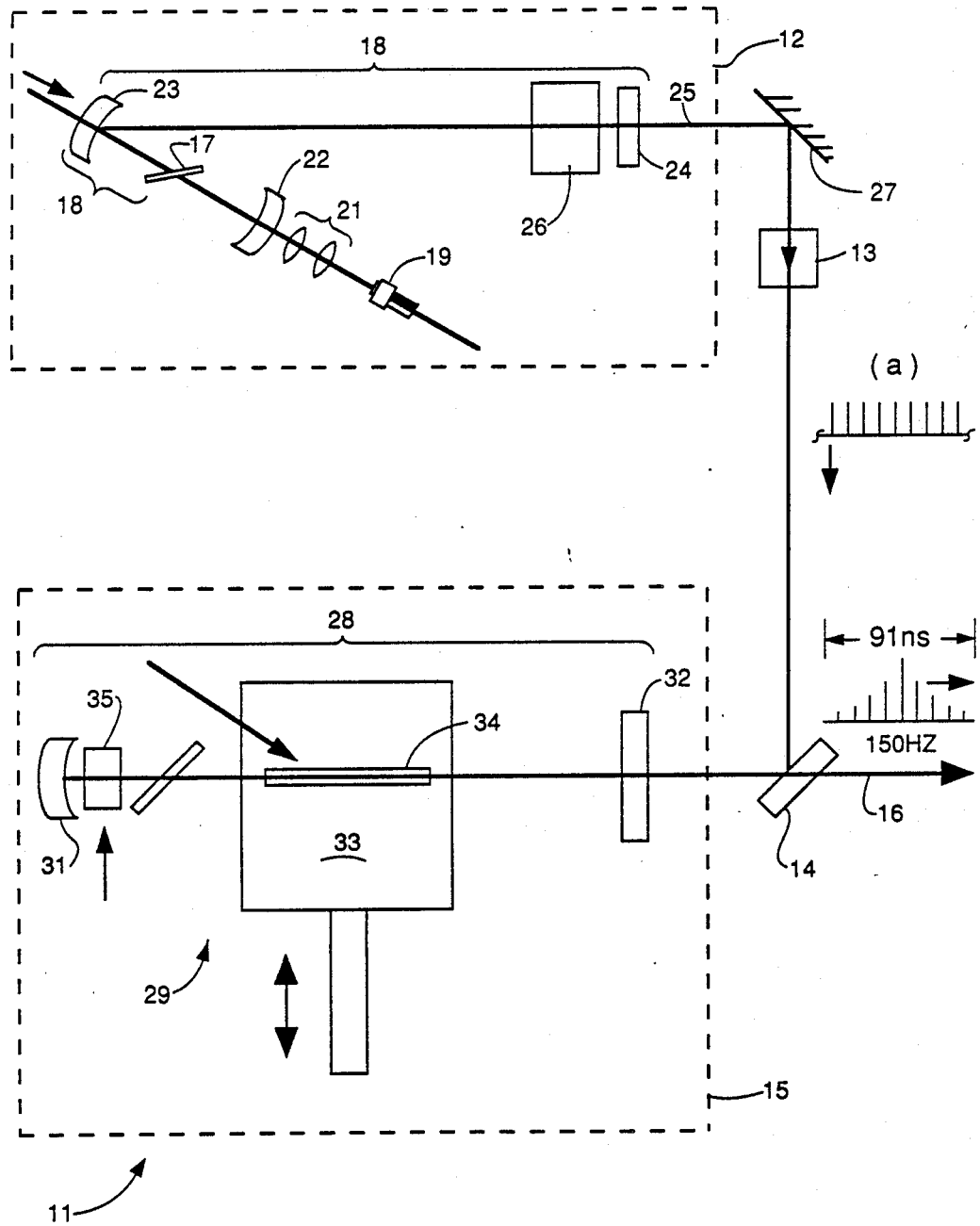

GENERATION OF SHORT HIGH PEAK POWER PULSES FROM AN INJECTION MODE-LOCKED Q-SWITCHED LASER OSCILLATOR

GOVERNMENT CONTRACT

The present invention was made in performance of a Government Contract, namely, Air Force Contract No. F 492620-85-C-0062 and the Government has certain rights therein.

BACKGROUND OF THE INVENTION

The present invention relates in general to generation of high peak power pulses from an injection mode-locked laser oscillator.

DESCRIPTION OF THE PRIOR ART

In many areas of laser science and applications, it is desired to provide optical pulses of greater than 200 MW of peak power. In some instances, it is desired that a short pulse in the range of 10 fs-1 ns be amplified for use.

In both of these cases, it is common practice to generate short pulses in a low peak power oscillator, and to increase the energy per pulse through multiple stages of amplification. The efficiency of multi-stage amplification is usually low. In some cases, a regenerative amplifier is used in which a pulse is switched into a Q-switched cavity and after a pre-determined number of round trips, the pulse is switched out. This method requires an intra-cavity switch, which limits the performance. Sophisticated electronic circuitry is also required for timing of injection and ejection of the pulse to be amplified.

One prior method of obtaining sub-nanosecond pulses from a Q-switched laser is by simultaneously mode-locking and Q-switching. This system suffers from the need to accommodate long mode-locking build-up time in the pump cycle, the need to stabilize a high power cavity for satisfactory mode-locking condition and the need to install a mode-locker in the high peak power cavity. Moreover, this method does not generate ultra-short pulses less than 20 ps duration. Moreover, this method does not provide high average power and high peak power.

An efficient laser source capable of producing high peak power pulses, i.e., greater than 200 MW, at high repetition rates, is useful for X-ray lithography and for constructing soft X-ray pumped XUV lasers. For example, a series of high peak power pulses separated by six ns offers the possibility of synchronously pumping XUV lasers. Also, synchronous pumping of optical parametric oscillators and of laser systems, such as Ti:Al$_2$O$_3$ to generate tunable radiation becomes possible with such a laser source.

SUMMARY OF THE PRESENT INVENTION

The principal object of the present invention is the provision of an improved generator of high peak power laser pulses In one feature of the present invention, a train of short pulses of lasant radiation to be amplified are injected into a Q-switched laser oscillator or seeding same. The pulse repetition time for the injected pulses corresponds to the round-trip time of the laser oscillator so that the injected pulses mode-lock the laser oscillator for efficiently amplifying the injected pulses.

In another feature of the present invention, the train of short pulses to be amplified is derived from another laser which is modulated so as to mode-lock this laser and to generate the train of short mode-lock pulses for injection into the Q-switched laser oscillator for amplification therein.

In another feature of the present invention, the laser generator for generating the train of mode-lock pulses to be amplified in the laser oscillator is continuously end-pumped by a pump selected from the group consisting of a semiconductive laser diode, a semiconductive diode and a dye laser.

In another feature of the present invention, the Q-switched laser oscillator, which is mode-locked by the injected seeding pulses, comprises a moving slab laser oscillator, whereby peak power of the amplified pulses is increased to a very high limit.

Other features and advantages of the present invention will become apparent upon a perusal of the following specification taken in connection with the accompanying drawings wherein:

BRIEF DESCRIPTION OF THE DRAWING

The drawing is a schematic line diagram, partly in block diagram form, of a laser system incorporating features of the present invention.

DESCRIPTION OF THE PREFERRED EMBODIMENTS

Referring now to the drawing, there is shown a high peak power laser pulse generator 11 incorporating features of the present invention. A train of pulses, to be amplified, are generated in a mode-locked oscillator 12 and injected via an optical isolator 13 and beamsplitting mirror 14 into a Q-switched oscillator 15 for amplification therein and extracted through the beam-splitter as output beam 16. In a typical example, the Q-switched oscillator 15 imparts on the order of 100 dB of gain to the pulses amplified therein.

The mode-locked oscillator source 12 of pulses to be amplified includes a slab of laser gain material 17 such as Nd:glass, 3 mm thick, and disposed at Brewsters angle to the optical axis of a confocal arm of a three-mirror optical resonator 18. The slab of lasant material 17 is optically end-pumped by means of a laser diode 19. The laser diode pump 19 is preferably index guided, operated cw and produces approximately 30 mW of optical pumping radiation in the wavelength range of approximately 0.8 μm. The pumping radiation emanating from the diode 19 is gathered and focused by focusing lenses 21 through an input mirror 22 of the resonator 18 and onto the laser gain medium 17 disposed at a waist of the confocal arm of the resonator 18. In a typical example, the beam waist has a cross-section at the laser gain medium of approximately 40 μm and the pumping radiation is focused to a beam spot of approximately 35 μm at the beam waist in the laser gain material to obtain good mode-matching between the collinear optical pumping radiation and the resonated lasant radiation within the optical resonator 18.

The confocal arm of the optical resonator 18 is defined between the spherically concave input mirror 22 and a second spherical mirror 23. A second arm of the optical resonator 18 is defined between the concave mirror 23 and an output planar mirror 24 coated to provide 0.5% transmission of the optical resonant radiation therethrough as an output beam 25.

An acousto-optic modulator 26 is disposed in the second arm of the optical resonator 18 near the output mirror 24 in a region where the resonant lasant radiation within the resonator 18 is substantially collimated for efficient amplitude modulation of the resonant radiation within the resonator 18. Acousto-optic modulator 26 is modulated at a frequency corresponding to the round-trip time of the resonator 18 so as to mode-lock the resonant lasant radiation within the resonator 18. A three-mirror optical resonator for use in a laser of this type is disclosed in the IEEE Journal of Quantum Electronics, Vol. 8, No. 3, pgs. 373–379 (1972), the disclosure of which is hereby incorporated by reference in its entirety.

When the laser oscillator 12 is mode-locked, as aforedescribed, the output beam 25 consists of a train of relatively short pulses at a repetition rate corresponding to the modulation frequency so that the pulses are all spaced equally at the round-trip time within the resonator 18. In a typical example, the resonator 18 has a length of approximately three meters to produce a round-trip time of approximately six ns so that each of the pulses of the train emanating from the mode-lock oscillator 12 is spaced by approximately six ns and each pulse has a width of approximately 10 ps. In such a case, the repetition rate frequency is approximately 175 MHz. The train of pulses is shown by waveform (a). The mode-locked pulses emanating from the mode-locked oscillator 12 are reflected from a mirror 27 thence through the optical isolator 13 to the beamsplitter 14. The beamsplitter reflects the train of mode-locked pulses coaxially into the optical resonator 28 of a moving slab Q-switched oscillator 29 for injection seeding and mode-locking the lasant radiation emanating from the moving slab laser oscillator 29. The moving slab laser 29 is of the type disclosed in an article appearing in Optics Letters, Vol. 11, No. 10, pgs. 617–619 of 1986, the disclosure of which is hereby incorporated by reference in its entirety. Moving slab lasers are also disclosed in U.S. Pat. No. 4,555,786 issued Nov. 26, 1985, the disclosure of which is hereby incorporated by reference in its entirety. Also, such a laser is disclosed and claimed in co-pending U.S. application Ser. No. #101,138 filed Sept. 24, 1987 and U.S. application Ser. No. #128,581 filed Dec. 4 1987, the disclosures of which are hereby incorporated by reference in its entirety.

Briefly, the optical resonator 28 is defined between a concave mirror 31 and a 50% transmissive planar mirror 32. A slab of lasant material, such as Nd:glass.33, is moved rectilinearly to-and-fro between a pair of neon flashlamps 34 for optically pumping a mode volume of the slab residing on the optical axis of the resonator 28. A Q-switch 35 is disposed on the optical axis of and within the resonator 28 for turning on and off the laser oscillator at a convenient frequency, as of 150 Hz.

The flashlamps 34 optically pump the mode volume of the lasant material 33. The injected pulses of lasant radiation to be amplified are injected into the mode volume of the laser gain material 33 to seed the lasant transitions of the optically pumped laser gain material. The resonator 28 is three meters in length so that its round-trip time is equal to the pulse spacing of the injected pulses of laser radiation to be amplified, whereby the oscillations of the Q-switched oscillator 15 are mode-locked to produce amplification of the injected pulses. In a typical example, the amplifier 15 provides approximately 100 dB of gain and the amplified pulses are extracted under an envelope of approximately 91 ns duration occurring at the Q-switched pulse repetition rate of about 150 Hz.

In a typical example, the output energy after a 64% beamsplitter 14 as output beam 16 was 6.3 mJ per pulse. With a measured injection mode-locking threshold of 460 fJ per pulse, this represented an energy amplification of greater than 100 dB. Peak power from these pulses was only limited by the non-linear optical effects in the resonator 28, the threshold for which was estimated to be 500 MW.

Normal Q-switched oscillation builds up from the spontaneous emission noise in the laser cavity 28. The output spectrum from the Q-switched laser 29 usually consists of a few axial modes which are not in phase. However, when injection seeded with the mode-locked pulse train of waveform (a), which contains a large number of phase-locked axial modes, a large number of axial modes in the Q-switched cavity 28 are excited in phase. In a few round-trips, the axial modes grow, and uniformly saturate the gain to produce an output containing a large number of phase- locked axial modes which result in a short mode-locked pulse. Since the output coupler 32 is partially reflective, a portion of the laser radiation is fedback to extract all stored energy in the resonator 28 in a series of short pulses. Because of the high gain in the cavity 28, the injection seeded pulse builds up within a few round-trips, such that the cavity length tolerance is not critical.

The laser generator 11 of the present invention is, therefore, useful in generating high peak power replicas of short mode-locked pulses. For example, the mode-lock pulse may be as short as three ps in a Nd:glass laser, 27 fs in a dye laser and 400 fs in a diode laser, any of which may be utilized as the source of the pulses to be amplified. The laser generator 11 is thus capable of generating very high peak power pulses of three ps duration at Nd:glass laser wavelength, 27 fs duration in a dye laser wavelength and 400 fs at a diodelaser wavelength. The minimum required injected energy is determined by the initial cavity noise field in optical resonator 28. The maximum amplified energy is determined by either the saturation fluence in the gain medium 33, or by the surface and bulk damage in the laser resonator 28, whichever is lower. For Nd:glass, a few tens of fJ of injected energy may be amplified by 120 dB of gain.

If the injected pulse train of waveform (a) is a short pulse, but not mode-locked, such that the phases of different frequency components in the pulse are not in distinct relationship with one another, the generator 11 will also work but suffers to some extent in performance in the areas of minimum required injected power and the preservation of the input pulse shape.

If the injected pulse, to be amplified, is a pulse which has chirp, the generator 11 is again operable. A chirped pulse has frequency variation across the duration of the pulse. The injection mode-locking for a Q-switched oscillator 15 works for a wide range of alues of the injected signal axial-mode separation for a fixed value of the axial-mode separation in the Q-switched oscillator 29. For an unchirped pulse, a fixed set of frequencies in the emission spectrum of the gain medium 33 in the Q-switched oscillator 29 are excited by the injected pulse. Chirped pulse amplification may be visualized as a comb of frequencies walking through this emission spectrum of the gain medium in the high-gain Q-switched oscillator 29.

In a typical example, 50 ps pulses from a cw mode-locked oscillator 12 containing 0.46 pJ per pulse were amplified to 12.6 mJ per pulse by a Q-switched oscillator 15. The amplification demonstrated by this operation was 104.4 dB. This amplification is much greater than that demonstrated by a multi-pass amplifier or by a regenerative amplifier which is typically 50 dB.

The efficiency of the injection mode-locked laser 29 is the same of that of a Q-switched laser, and hence approaches the efficiency of a long pulse non-Q-switched oscillator. The characteristics of the injection mode-locked and Q-switched oscillator 29 improves with increase in gain. The simplicity of the injection mode-locking operation is remarkable. It does not require an extra intra-cavity switch and any associated sophisticated timing electronics. The two cavities 28 and 18 need to be matched in length to typically within a mn which is quite advantageous for high average power operation where thermal effects are significant. If a single high peak power pulse is desired, standard electronics can be used to switch out a pulse from the output pulse train at 16.

The peak power limit in an amplifier operating with subnonosecond pulses is set by non-linear optical effects in the gain medium 33. By first introducing chirp and group velocity dispersion in a pulse, the broadened pulse can be amplified in a regenerative amplifier and the output pulse compressed by a diffraction grating by the technique of chirped pulse amplification to overcome this peak power limit. It is possible to incorporate the chirped pulsed technique in the injection mode-locked laser 29. In one such configuration, 5 ps pulses from a mode-locked Nd:glass laser 12 may be chirped by self-phase modulation and broadened to 300 ps by group velocity dispersion in an optical fiber. With a 2 $GW/cm^2$ damage limit in the Q-switched oscillator 29, the maximum injection mode-locked output energy at 16 will be limited to 150 mJ for the present oscillator beam cross-section. The amplified pulse may then be compressed in a grating pair to generate subpecosecond pulses containing greater than 150 GW of peak power. The repetition rate for a Q-switched Nd:glass moving slab laser injected by chirped mode-locked pulse can be as high as 150 Hz.

Although a moving slab laser 29 has been disclosed, other solid state lasers may be employed as well, such as lamp pumped rod lasers of Nd:YAG or Nd:glass or Nd:YLF.

What is claimed is:

1. In a method for generating high peak power pulses of lasant radiation, the steps of:
    generating a train of short pulses of lasant radiation to be amplified having a certain pulse repetition time;
    injecting said train of pulses into the optical resonator and optically pumped gain medium of a Q-switched laser oscillator said optical resonator having a round-trip time generally corresponding to the pulse repetition time of said injected pulses for injection mode-locking the resonated lasant radiation emanating from said optically pumped gain medium of said oscillator and for amplifying the injected pulses, thereby generating a train of amplified high peak power pulses of lasant radiation.

2. The method of claim 1 wherein the step of generating the train of short pulses of lasant radiation to be amplified includes the steps of:
    optically pumping a second laser gain medium with optical pumping radiation to produce optical lasant radiation;
    resonating said optical lasant radiation emanating from said second laser gain medium in a second optical resonator containing said second laser gain medium and having a second certain round-trip time; and
    modulating the resonated optical lasant radiation within said second optical resonator at a modulation frequency corresponding to the round-trip time within said second optical resonator for mode-locking the resonated optical lasant radiation to produce the train of short pulses of optical lasant radiation to be amplified in said injection-mode-locked Q-switched laser oscillator.

3. The method of claim 2 wherein the step of optically pumping said second laser gain medium includes the step of collinearly end pumping said second laser gain medium with optical pumping radiation emanating from a source selected from the group consisting of a semiconductive diode and a semiconductive laser diode.

4. The method of claim 1 wherein the laser gain medium of said Q-switched laser oscillator comprises a slab of solid state laser gain material, and including the step of:
    moving the optically pumped region of said slab within said slab so as to average the thermal loading effects within said slab, whereby said laser oscillator is operable at higher power levels.

5. In a laser generator for generating high peak power pulses of lasant radiation:
    pulse generating means for generating a train of short pulses of lasant radiation to be amplified having a certain pulse repetition time; and
    laser oscillator means having an optically pumped laser gain medium disposed within an optical resonator and including a Q-switch for modulating the Q of said optical resonator of said laser oscillator means; and
    injecting means for injecting said generated train of pulses into said optical resonator and optically pumped gain medium of said Q-switched laser oscillator means, said optical resonator having a round-trip time generally corresponding to said certain pulse repetition time of said injected pulses for injection-mode-locking the resonated lasant radiation emanating from said optically pumped gain medium of said laser oscillator means and for amplifying the injected pulses, thereby generating a train of amplified high peak power pulses of lasant radiation.

6. The laser of claim 5 wherein said generating means for generating the train of short pulses to be amplified includes:
    optical pumping means for optically pumping a second laser gain medium with optical pumping radiation to produce optical lasant radiation;
    second optical resonator means for resonating said optical lasant radiation emanating from said second laser gain medium in said second optical resonator containing said second laser gain medium and having a second certain round-trip time; and
    modulating means for modulating the resonated optical lasant radiation within said second optical resonator means at a modulation frequency corresponding to the round-trip time within said second optical resonator means for mode-locking the resonated optical lasant radiation to produce the train of short pulses of optical lasant radiation to be amplified in said injection mode-locked Q-switched laser oscillator means.

7. The laser of claim 6 wherein said optical pumping means for optically pumping said second laser gain medium includes means for collinearly end pumping said second laser gain medium with said optical pumping radiation emanating from a source selected from the group consisting of a semiconductive diode and a semiconductive laser diode.

8. The laser of claim 5 wherein said laser gain medium of said Q-switched laser oscillator means comprises a slab of solid state laser gain material, and including:
  moving means for moving the optically pumped region of said slab within said slab so as to average the thermal loading effects within said slab, whereby said laser oscillator means is operable at higher power levels.

9. In an injection mode-locked laser oscillator for generating a train of high peak power pulses of optical lasant radiation:
  a first optical resonator;
  a first solid state laser gain medium disposed within said first optical resonator;
  a first source of first optical pumping radiation disposed for directing optical pumping radiation into said first solid state laser gain medium for optically pumping same to excite optical lasant radiation emanating from said first gain medium and resonated by said first optical resonator;
  an optical modulator for modulating the resonated optical lasant radiation at a modulation frequency corresponding to the round-trip time of said first optical resonator for mode-locking the resonated lasant radiation and producing a train of mode-locked pulses of said resonated lasant radiation to be amplified with a pulse timing corresponding to the round-trip time of said first optical resonator;
  a second optical resonator disposed to receive said train of mode-locked pulses of lasant radiation and having a round-trip time generally equal to the round-trip time of said first optical resonator;
  a second solid state laser gain medium disposed within said second optical resonator;
  a second source of optical pumping radiation disposed to illuminate said second laser gain medium for optically pumping same to excite optical lasant radiation emanating from said second optically pumped laser gain medium and resonated by said second optical resonator and injection mode-locked by said train of mode-locked pulses of lasant radiation to be amplified for amplifying said train of pulses; and
  a Q-switch member disposed in said second optical resonator for Q-switching the amplified train of pulses of optical lasant radiation resonated by said second optical resonator.

10. The laser of claim 9 wherein said second laser gain medium comprises a slab of laser gain material moved so as to average the heating effects therein due to absorption of the optical pumping radiation.

11. The laser of claim 9 wherein said first laser gain medium is Nd:glass.

* * * * *